United States Patent
Hill et al.

(10) Patent No.: US 8,091,955 B2
(45) Date of Patent: Jan. 10, 2012

(54) SLIDING WINDOW FOR WORK VEHICLE CAB

(75) Inventors: Aaron G. Hill, Forman, ND (US); Joshua F. Maus, Fargo, ND (US); Gary J. Homola, Henning, MN (US); Maria C. Homola, legal representative, Henning, MN (US)

(73) Assignee: Clark Equipment Company, West Fargo, ND (US)

( * ) Notice: Subject to any disclaimer, the term of this patent is extended or adjusted under 35 U.S.C. 154(b) by 285 days.

(21) Appl. No.: 12/424,847

(22) Filed: Apr. 16, 2009

(65) Prior Publication Data
US 2010/0264695 A1    Oct. 21, 2010

(51) Int. Cl.
*B60J 1/16*     (2006.01)
*B60J 11/08*    (2006.01)

(52) U.S. Cl. ............................. 296/190.1; 296/146.16

(58) Field of Classification Search .......... 296/190.01, 296/190.03, 190.08–190.11, 146.16; 180/89.12
See application file for complete search history.

(56) References Cited

U.S. PATENT DOCUMENTS

| | | | |
|---|---|---|---|
| 2,563,730 A | 8/1951 | Martin, Jr. | |
| 2,576,392 A | 11/1951 | Downes | |
| 3,851,845 A | 12/1974 | Edwards | |
| 4,050,735 A | 9/1977 | Molnar | |
| 4,082,343 A | 4/1978 | Hurt, II et al. | |
| 4,095,640 A | 6/1978 | Beckerer, Jr. | |
| 4,102,011 A | 7/1978 | Clack, Jr. | |
| 4,392,669 A | 7/1983 | Martin, Jr. | |
| 4,518,195 A * | 5/1985 | Tindall et al. | 296/148 |
| 4,546,693 A | 10/1985 | McTaw, Jr. | |
| 5,315,952 A | 5/1994 | Jackson, Jr. | |
| 5,419,088 A | 5/1995 | Raymond et al. | |
| 5,467,560 A | 11/1995 | Camp et al. | |
| 5,560,149 A | 10/1996 | Lafevre | |
| 5,642,915 A | 7/1997 | Ackermann et al. | |

(Continued)

FOREIGN PATENT DOCUMENTS
DE         19921481 A1     11/2000
(Continued)

OTHER PUBLICATIONS

Notification of Transmittal of International Search Report and Written Opinion dated Sep. 23, 2010 for related PCT Application Serial No. PCT/US2010/030830, filed Apr. 13, 2010, 12 pgs.

*Primary Examiner* — Glenn Dayoan
*Assistant Examiner* — Gregory Blankenship
(74) *Attorney, Agent, or Firm* — John D. Veldhuis-Kroeze; Westman, Champlin & Kelly, P.A.

(57) ABSTRACT

A cab for a vehicle has an inset mesh screens along opposite side walls that define window openings through which an operator can view the surroundings, and the window opening is covered with a window assembly including a sliding window panel. The sliding window panel has a latch member that extends through a slot in the mesh screen, and a spring loaded knob that will seat in detents in the mesh screen at selected positions along the slot. The spring loaded knob is on the interior of the cab and is secured in place. The inset of the mesh screen forms a recessed receptacle for the window assembly so window panels of the window assembly do not project outwardly beyond the side surfaces of the cab.

16 Claims, 4 Drawing Sheets

U.S. PATENT DOCUMENTS

| | | | |
|---|---|---|---|
| 5,765,325 A | 6/1998 | DeBlock | |
| 5,778,629 A | 7/1998 | Howes | |
| 5,937,611 A | 8/1999 | Howes | |
| 6,101,783 A | 8/2000 | Howes | |
| 6,149,228 A | 11/2000 | O'Neill et al. | |
| 6,155,632 A | 12/2000 | Fujimoto | |
| 6,189,954 B1 * | 2/2001 | Martin, Jr. | 296/190.08 |
| 6,247,746 B1 | 6/2001 | Brush | |
| 6,330,765 B1 | 12/2001 | Dahl | |
| 6,382,711 B2 * | 5/2002 | Martin, Jr. | 296/190.08 |
| 6,427,383 B1 | 8/2002 | Brooks et al. | |
| 6,561,572 B1 * | 5/2003 | Martin, Jr. | 296/190.1 |
| 6,715,245 B2 | 4/2004 | Lewkowitz | |
| 6,883,755 B2 | 4/2005 | Pautis et al. | |
| 7,252,325 B2 * | 8/2007 | Richards et al. | 296/190.08 |
| RE40,636 E | 2/2009 | Weinert et al. | |
| 7,758,104 B2 * | 7/2010 | Liebl et al. | 296/190.1 |
| 2003/0110703 A1 | 6/2003 | Kobrehel | |
| 2007/0245522 A1 | 10/2007 | Selvaraj | |

FOREIGN PATENT DOCUMENTS

| | | |
|---|---|---|
| EP | 1063111 A2 | 12/2000 |
| EP | 1 066 998 A2 | 1/2001 |
| EP | 1529708 A1 | 5/2005 |
| EP | 1916131 A1 | 4/2008 |
| WO | WO 2005/007429 A1 | 1/2005 |

* cited by examiner

SLIDING WINDOW FOR WORK VEHICLE CAB

BACKGROUND OF THE DISCLOSURE

The present disclosure relates to a window for a work vehicle cab which has a large open mesh protective screen covering a window opening in a cab side, with the screen recessed from an outer cab surface, and with a window assembly including a sliding window portion positioned to the exterior of the screen. The sliding window portion is operable from the interior of the cab.

Vehicle cabs, such as cabs of compact loaders, have sturdy side mesh screens that have large openings for outside visibility by the operator. The perimeter of the mesh screen defines a window opening. The mesh screen is strong enough to protect the occupant. It is desirable to have windows in the window openings to cover the mesh screen for dust and temperature control, and it is also desirable to have at least a portion of the window operable for ventilation and communication. The windows on existing work vehicle cabs are placed to the interior of the mesh screen. The outside surfaces of the window get dirty much more quickly than the inside surfaces, and in order to clean the window the window generally has to be removed from its mounting because of the mesh screen positioned to the exterior of the window.

U.S. Pat. No. 6,330,765 illustrates a window of a cab of a compact loader, which is on the interior of the mesh screen, and which is removable so that it can be cleaned.

SUMMARY OF THE DISCLOSURE

The present disclosure illustrates a window assembly for covering a window opening of a work vehicle cab, such as that of a compact loader, which window opening has a protective mesh screen over the window opening. The window assembly includes a sliding window panel that can be controlled or operated by an operator inside the cab, with the window mounted to the exterior of the mesh screen.

The mesh screen is recessed from the side exterior surfaces of the vehicle cab, and the window assembly is fitted in this recess so that none of the glass or other transparent window panel material protrudes beyond the surface of the exterior of the cab, to thereby gain added protection for the window panes. The sliding portion of the window is operated with a latch mounted on the sliding portion and extending through a guide slot formed in the screen.

The latch includes an interior latch knob that is releasable so the latch and the sliding window panel are movable in direction along a slot in the mesh screen. The sliding portion of the window can be moved to selected detented positions and will be retained in such position. The knob portion of the latch that is on the interior of the cab cannot be passed through the slot, so the sliding portion of the window cannot be removed from the exterior unless the latch is first removed. This adds an anti-theft protection feature because the sliding panel cannot be easily removed from the exterior to gain access to the interior of the cab, when a cab door is locked.

The latch knob or slider knob can be located so that it is easily accessible to an operator seated in the cab, and has essentially bind-free motion. The recessing of the screen and the window assembly is such that the window panes in the window assembly do not protrude beyond the plane of the exterior surface of the cab. Things that strike the cab will first strike metal rather than the window.

DETAILED DESCRIPTION OF ILLUSTRATIVE EMBODIMENTS

Figure 1:
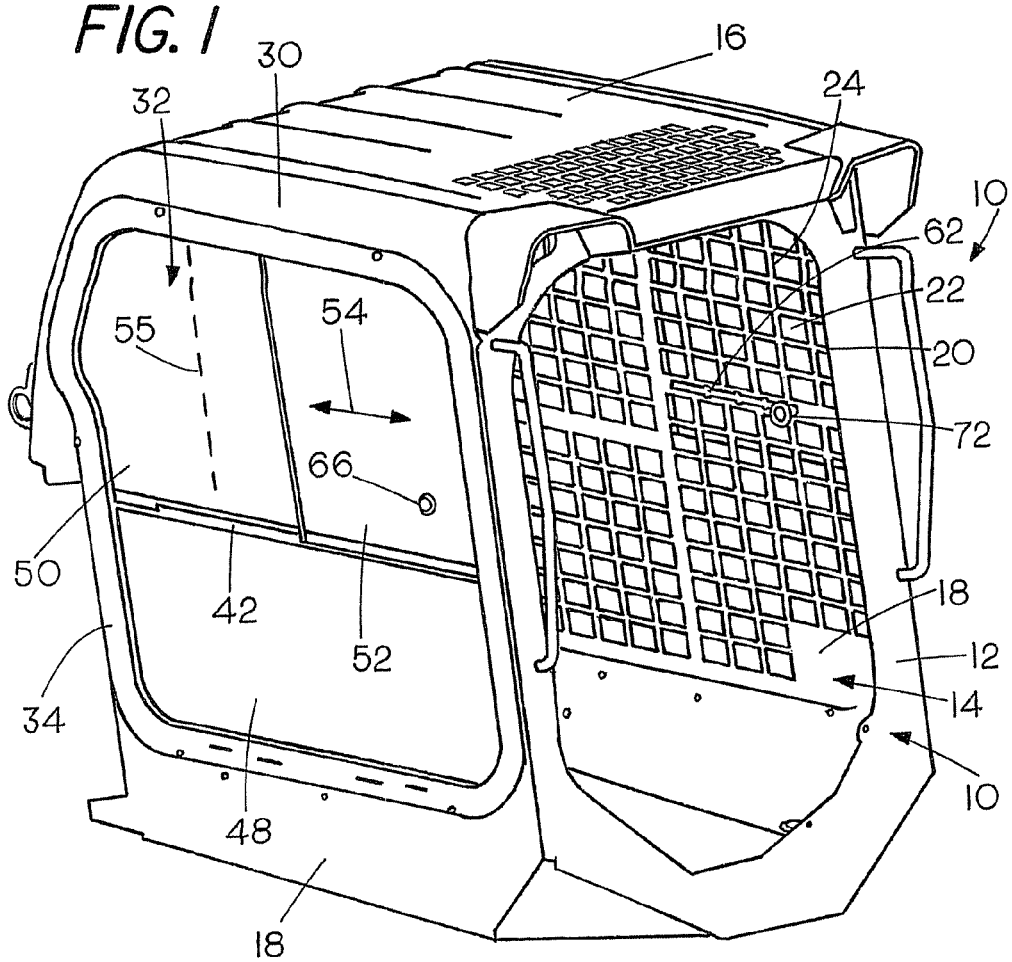
FIG. 1 is a front perspective view of a compact loader cab, having a window assembly made according to the present disclosure installed thereon on both the left and right sides.
Figure 3:
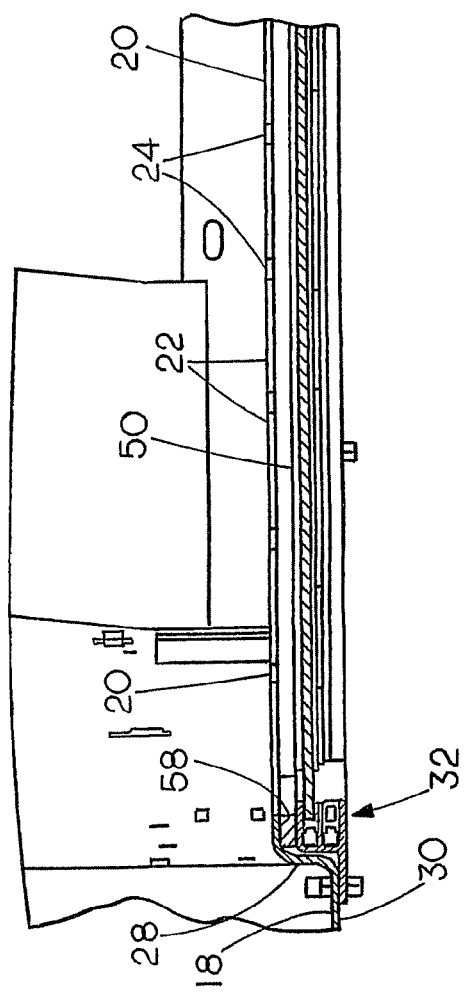
FIG. 3 is a sectional view taken generally on lines 3-3 in FIG. 2.

FIG. 1 illustrates a cab 10 for a work vehicle, such as a compact loader. U.S. Pat. No. 6,330,765 illustrates the type of loader on which a cab 10 will be mounted, and the disclosure of U.S. Pat. No. 6,330,765 is incorporated by reference. The cab 10 includes a front wall 12 that has an operator access opening 14, and the cab also has a top wall 16 as well as left and right side walls 18. The left and right side walls each include a window opening that is covered by a mesh screen indicated at 20. The mesh screen is formed by punching out openings 22 to permit an operator to see outside the cab and leaving cross bars 24 of suitable size and strength. The mesh screen 20 is formed from the same material and can be formed as a unit with the cab side walls 18. As can be seen in FIG. 3 and also in FIG. 5, the mesh screen 20 is formed inwardly or inset to form a recess with offset wall portions 28 around the mesh screen perimeter, to recess the mesh screen inwardly from the general plane shown at 30 of the side of the cab.

The recessed mesh screen defines an opening called a window opening bounded by the inset walls 28. The mesh screen 20 provides for ventilation as well as for visibility for the operator on the interior of the cab 10.

The recessed window openings defined by the perimeter wall portions 28 is covered, in this disclosure by a window assembly 32 made up of transparent window panels held in a frame. The window assembly includes a perimeter or peripheral frame 34, that has a perimeter flange 36, and an inset wall portion 38. The inset wall portion 38 fits within the perimeter defined by the wall portions 28 of the formed cab side wall that joins the mesh screen to the exterior walls of the cab. The flange 36 fits against the exterior surface 30 of the respective cab side wall 18.

The flange 36 is bolted in place or otherwise fastened in a suitable manner to surround the window opening covered by the mesh screen 20.

Figure 2:
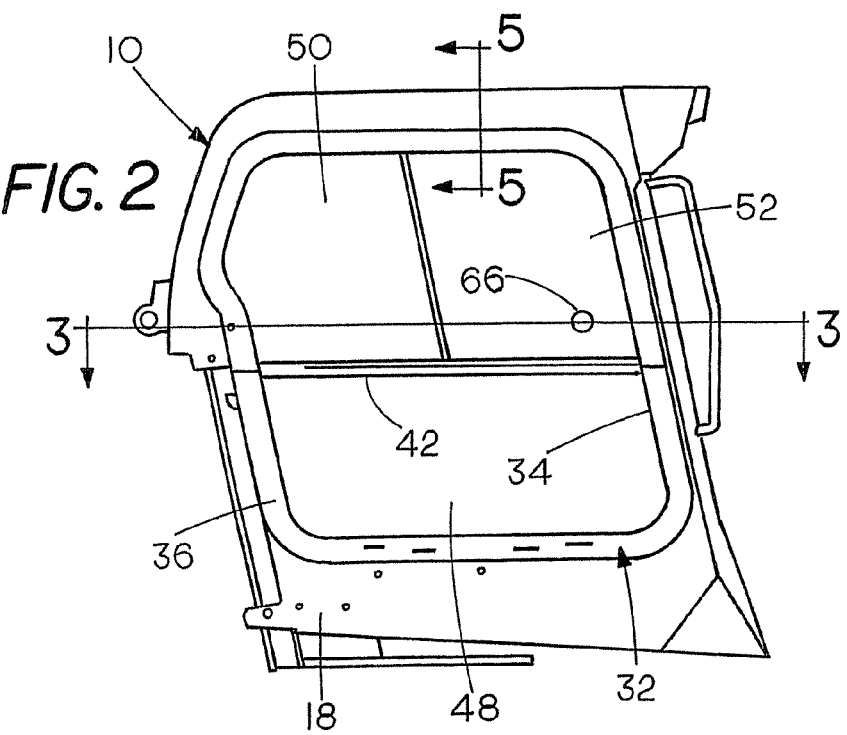
FIG. 2 is a side elevational view of the cab.
Figure 5:
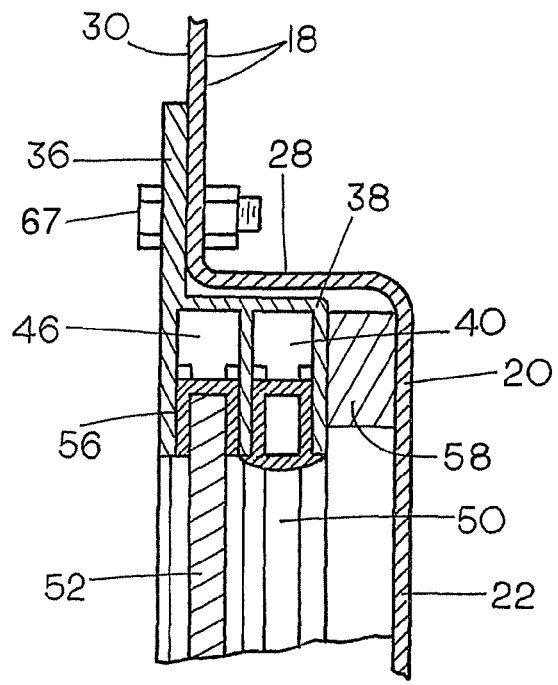
FIG. 5 is a fragmentary sectional view taken on line 5-5 in FIG. 2.

Window frame 34 includes suitable window panels mounting or retaining tracks, and a typical track for a fixed window panel is indicated at 40 (FIG. 5). The window frame supports a cross track 42 that can be seen in FIGS. 1 and 2, as well. Further, the window frame 34 includes a track portion 46 that is used for mounting a sliding glass panel.

The cross track 42 and the bottom portion of the inset portion 38 of the frame 34 provided hold a fixed lower window panel 48, that remains in position and provides visibility for the operator. The horizontal cross track 42 also supports the lower edge of a fixed window panel 50 that is mounted in the track portion 40 along the top and rear sides, and extends substantially halfway forwardly along the window opening.

A sliding window panel 52 is mounted in track portion 46 and an upper side of the cross track 42 for sliding movement in fore and aft direction as indicated by the double arrow 54 in FIG. 1. The sliding window panel can be held in suitable guides 56 as shown in FIG. 5, or any other suitable slidable mounting.

Also, the window panels can have weather seals on them for sealing out dust and dirt, and the sliding panel 52 has sliding seals. A perimeter weather seal 58 is provided around the perimeter of the window opening and window frame.

It can be seen in FIG. 5 in particular that the window panels are to the inner side of the flange 36 of the window frame, and thus the window panels are recessed inwardly from the surface 30 of the side walls 18. The sliding window panel 52 is to the exterior of the upper fixed panel 50 and slides past the fixed panel 50 when it is moved rearwardly to provide ventilation generally as shown by the dotted edge line 55 in FIG. 1.

Figure 4:
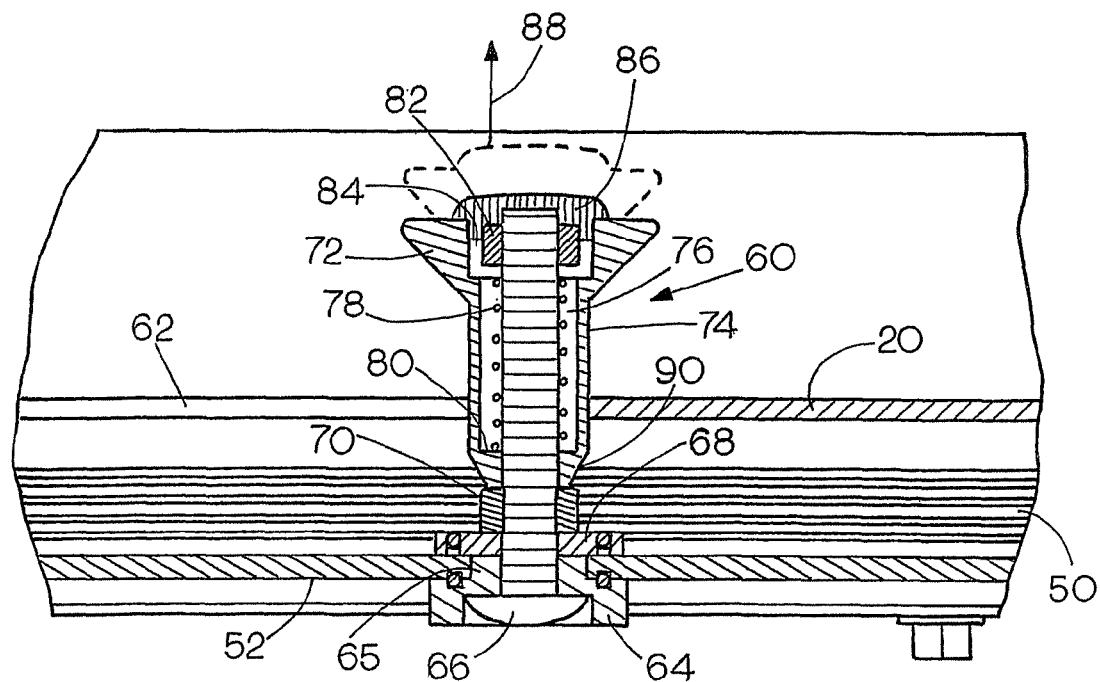
FIG. 4 is an enlarged section view of a slider latch and knob used with the sliding window portion of the present disclosure.
Figure 6:
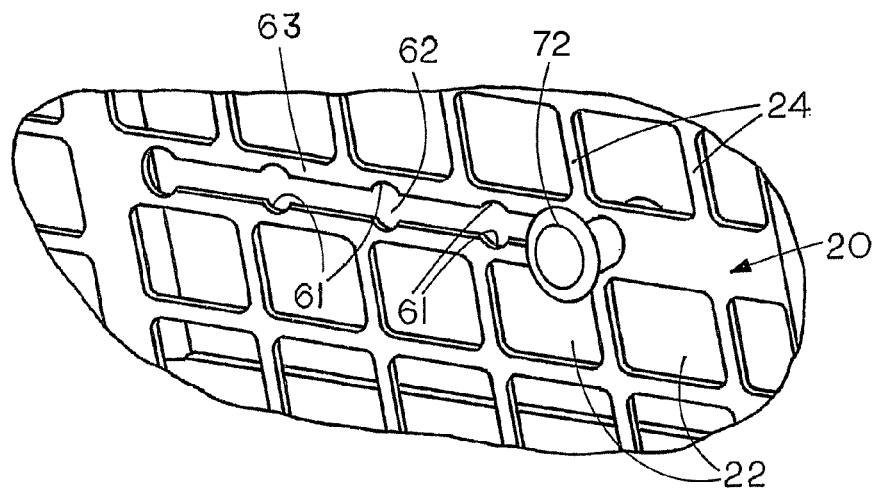
FIG. 6 is a perspective detailed view showing a guide slot for the sliding window latch and detent portions in the guide slot.

The sliding window panel 52 is controlled by the operator by utilizing a latch assembly 60 shown in detail in FIG. 4, which extends inwardly from the sliding glass panel 52, and, as shown in FIG. 6, through a generally horizontal slot 62 that is formed in a horizontal bar 63 of the side mesh screen 20. The slot 62 has a plurality of detents 61 formed as notches in the edges of the slot 62, which are spaced along the slot.

The latch 60 is made so that it is "springloaded" and has a bolt or pin member that is secured to the window panel 52. As shown in FIG. 4, there is a bushing 64 that receives a through bolt 66, with the head of the bolt 66 on the exterior of the sliding panel 52. The bushing has a neck 65 that fits into an opening in the sliding window panel, while a flange portion of the bushing 64 fits against the exterior surface of the window panel 52. Suitable seals can be provided. An inner bushing 68 is placed over the bolt 66 and against the panel 52.

When bushings 64, 68 and bolt 66 are in place, a nut 70 is tightened down along the bolt to hold the bolt 66 in position extending outwardly like a stud.

Figure 7:
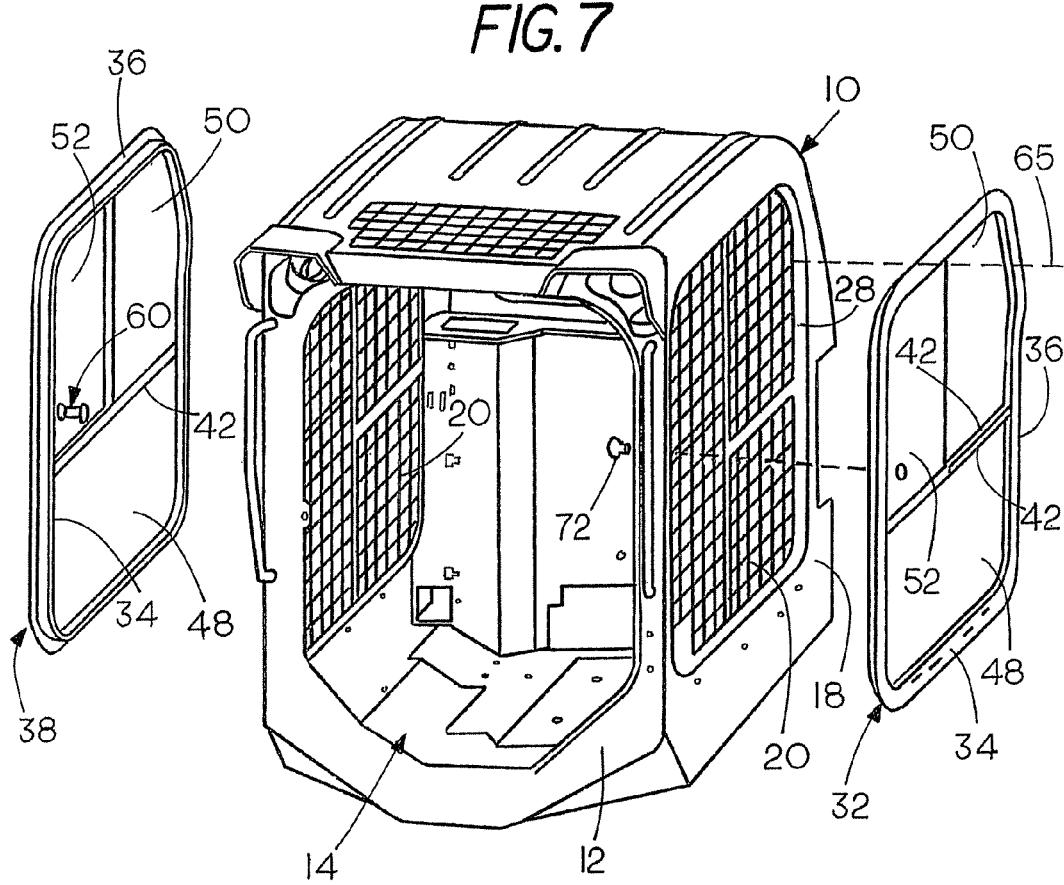
FIG. 7 is a perspective view of the cab showing window assemblies positioned for mounting on the cab side panels.

The window assembly including frame 34 and the window panels is placed into the window opening recess in the side of the cab wall as represented in FIG. 7 and held in place with fasteners 67. The bolt 66 will project through the slot 62 in the screen 20. A latch knob 72 is placed over the bolt 66 and is on the inside of the cab. The latch knob has a cylindrical shank 74 and a tapered end 90 that fits into the slot 62. The cylindrical shank 74 fits into the detents 61. The shank 74 has an interior cavity or chamber 76. A spring 78 is slipped over the bolt 66, and is positioned inside the chamber 76. The spring abuts against a shoulder 80 formed between the cavity 76 and the end portion of the knob.

The bolt 66 extends substantially the same length outwardly as the knob when the knob is seated in the slot 62 and against the nut 70. A second nut 82 is threaded onto the end of the bolt 66 and seats within a recess 84 at the outer end of the knob 74 and retains the spring 78 on the bolt. A suitable cap 86 can be placed to cover the recess 84 and the nut 82.

The knob 72 can be manually released from its seat in its detented position in the slot 62 by pulling it away from the mesh screen in the direction as indicated by the arrow 88. The spring 78 will compress sufficiently to permit the shank portion 74 to clear the detents of screen 20, so that the knob and the sliding window panel can be slid along the slot 62 to a desired position. By releasing the knob, the spring 78 will cause the knob to ride along the slot recess, and the tapered end 90 will permit the knob to be moved along the slot, once it has been released, until the end 90 snaps into the next detent position in one of the detents 61.

Thus, it is a simple task for an operator on the interior of the cab to grab the latch knob 72, pull it out, and slide the window panel 52 to a desired position, either open or closed. The knob can be released and the spring 78 will cause the knob to seat.

The mesh screen 20 protects the operator, and the recessing of the window from the outer surface of the cab itself also tends to protect the window panes or sections.

While the window panes can be glass, as described, other transparent materials could be used for the sliding panel 52, as well as the stationary window panels 48 and 50 that cover the window opening.

It also can be seen that once the latch is assembled, the sliding panel 52 cannot be removed outwardly from the screen 20 from the outside of the cab. The knob 72 on the inside of the cab has to be removed first, and this reduces the likelihood of gaining access to the interior of the cab by taking out the sliding panel of the window.

The knob 72 can be located in an optimum position for operation by the operator of the work vehicle on the interior of the cab, so that the sliding window panel can be moved, from one detented position to another.

The entire window assembly 32 can be made prior to installation on the cab, except for adding the latch knob, and thus can be mounted to the cab, and can be removed if desired when a window is not needed or wanted. The window frame bolts in place, as shown, and by removing a few bolts or other fasteners, the entire window frame 34, including the stationary panels and the sliding panel can be removed as a unit.

It should also be noted that each side mesh screen is formed integrally with and as part of the cab side wall. The mesh screens are formed inwardly and define a recessed receptacle having a perimeter. The perimeter is defined, as shown by walls 28. The recessed receptacle formed can receive a window assembly where the window panels do not protrude outwardly beyond the outer side of the cab side wall. The offset and the addition of the slot for the sliding glass window panel latch can be formed at the same time as openings 22 without any additional operations.

Although the present invention has been described with reference to preferred embodiments, workers skilled in the art will recognize that changes may be made in form and detail without departing from the spirit and scope of the invention.

What is claimed is:

1. A window assembly for a cab of a vehicle having a mesh screen on a side wall, the mesh screen covering a window opening, the window assembly including a sliding panel movable in a fore and aft direction, said window assembly being supported adjacent and in registry with the mesh screen and positioned to an exterior of the mesh screen, a latch for the sliding panel including an elongated member secured to the sliding panel and projecting outwardly therefrom, said elongated member extending through a portion of the mesh screen, a spring loaded latch mounted on said elongated member positioned on a side of the mesh screen opposite from the sliding panel, said spring loaded latch being urged toward the mesh screen under a spring load to engage detents formed on the mesh screen, and the spring loaded latch being manually moved outwardly along the elongated member to clear the detents and permit sliding the sliding panel under control from an interior of the cab.

2. The apparatus of claim 1 wherein said mesh screen comprises a panel having a plurality of openings therethrough, and having a slot extending generally parallel to tracks supporting the sliding panel, and the elongated member projecting from the sliding panel through the slot, the spring loaded knob being used to engage detent recesses on edges of the slot.

3. The apparatus of claim 1, wherein said mesh screen is unitarily formed with a side panel of the cab and inset from an exterior of the side panel to form a recess in registry with the mesh screen, said window assembly fitting in the recess such that window panels carried on the window assembly do not extend outwardly beyond the exterior of the side wall of the cab.

4. The apparatus of claim 1, the window assembly further comprising a frame around a perimeter of the window assembly, and a flange extending outwardly from the frame, said flange engaging an exterior surface of said side panel wherein said window assembly is supported adjacent and in registry with the mesh screen.

5. The apparatus of claim 3, wherein said window assembly includes a frame forming a perimeter of the window assembly, said frame fitting in the recess, and a flange on the frame that engages the exterior of the side panel to support the window assembly in position in the recess.

6. A cab for a compact loader having a side wall with a mesh screen defining a window opening, said mesh screen being integrally formed with the side wall and offset inwardly from an exterior plane of the outside side wall of the cab, said offset forming a recess having a perimeter for receiving a window assembly that fits within the recess.

7. The cab of claim 6, wherein the window assembly includes a perimeter frame, and window panels mounted in said perimeter frame, said perimeter frame, said frame having flanges around a perimeter of the perimeter frame, and the window assembly fitting into the recess, with the flanges against an exterior outer surface of the side wall of the cab such that the window panels do not protrude outwardly from the exterior plane of the side wall of the cab.

8. The cab of claim 7 further comprising one of the window panels being a sliding window panel slidable in a fore and aft direction.

9. The cab of claim 8 wherein the sliding window panel has a latch member including a stud member protruding inwardly from the sliding window panel toward an interior of the cab, said stud member extending through a slot in the mesh screen, and a spring loaded knob mounted on said stud member on an interior side of the mesh screen, and movable from a position wherein it clears the mesh screen to permit sliding the sliding window panel in direction along the slot, to a second normal position engaging detents in the mesh screen along edges of the slot.

10. The cab of claim 9, wherein said spring loaded knob comprises a cylindrical body having a central opening that slides over the stud member, a cavity in said cylindrical body forming a shoulder with respect to the opening, a spring seated against the shoulder on the interior of the cavity, and a retainer mounted on the stud member for holding the spring in position in the cavity while permitting the cylindrical body to slide along the stud member.

11. The cab of claim 10, wherein the cylindrical body has a tapered end that engages detents in the slot in the mesh screen.

12. The cab of claim 7, wherein said flanges are secured to the side wall of the cab with removable fasteners.

13. The cab of claim 7, wherein said window assembly includes tracks for supporting window panels, said tracks including a cross track spaced upwardly from a bottom side of said frame and holding a fixed window panel between the track and the bottom side of the frame, the sliding panel being positioned between the cross track and an upper side of the frame.

14. A window assembly for a cab of a vehicle having a mesh screen on a side wall, the mesh screen being offset from an outer side of the side wall and the offset forming a recessed receptacle defining a window opening, a window assembly mounted in said recessed receptacle on an exterior of the mesh screen, said window assembly including a sliding panel movable in a fore and aft direction, said sliding panel having a stud member extending outwardly therefrom toward an interior of a cab on which the window assembly is mounted, a slot defined in said mesh screen extending in fore and aft direction, said stud member extending through said slot and having an end on an interior of a cab on which the window assembly is mounted, and a spring loaded knob mounted on the stud member on an interior side of the mesh screen and being urged toward the mesh screen, the slot having detent portions into which at least portions of the spring loaded knob is urged by a spring load.

15. The window assembly of claim 14, wherein the spring loaded knob slides along the stud member, and is retained on the stud member with a fastener positioned on an interior of a cab on which the window assembly is mounted.

16. The window assembly of claim 15, wherein said stud member comprises a bolt secured through an opening in the sliding panel, said spring loaded knob having an opening so that it is slidable along the bolt, and having an interior chamber of larger diameter than the opening, a spring mounted in the interior chamber, and a spring retainer mounted on an outer end of said stud member to hold the spring in position relative to an outer end of the stud member, the spring loaded knob being slidable outwardly from the mesh screen along the bolt.

\* \* \* \* \*